United States Patent

Fujii

[15] 3,648,085
[45] Mar. 7, 1972

[54] LIQUID COOLING ARRANGEMENT FOR DYNAMOELECTRIC MACHINE

[72] Inventor: Robert L. Fujii, Cleveland, Ohio
[73] Assignee: Lear Siegler, Inc., Santa Monica, Calif.
[22] Filed: Mar. 26, 1970
[21] Appl. No.: 22,752

[52] U.S. Cl. .................................................. 310/54
[51] Int. Cl. .................................................. H02k 9/20
[58] Field of Search .................. 310/54, 55, 58, 59, 64, 159, 310/168, 171

[56] References Cited

UNITED STATES PATENTS

| | | | |
|---|---|---|---|
| 3,030,529 | 4/1962 | Jaeschke | 310/54 |
| 3,158,009 | 11/1964 | Rayner | 310/54 |
| 3,372,292 | 3/1968 | Lynch | 310/54 |
| 3,435,261 | 3/1969 | Spiess | 310/58 |
| 3,445,695 | 5/1969 | Schultz | 310/58 |
| 3,479,541 | 11/1969 | Robinson | 310/54 |
| 3,480,810 | 11/1969 | Potter | 310/54 |

Primary Examiner—William M. Shoop, Jr.
Assistant Examiner—R. Skudy
Attorney—Bosworth, Sessions, Herrstrom and Cain

[57] ABSTRACT

A method of and apparatus for cooling the heat-producing electrical windings of a dynamoelectric machine by spraying them directly with atomized coolant to deposit a coating of liquid coolant which flows over and away from them to carry away heat picked up from them by conduction. Hydraulically atomized particles are projected at low velocity to thoroughly wet or coat the structures to be cooled and to increase the heat transfer to the coolant. The spray nozzles are arranged and their outputs shielded to minimize any insulation erosion that might result from centrifugal motion of coolant and from the low velocity sprays.

12 Claims, 3 Drawing Figures

Patented March 7, 1972 3,648,085

INVENTOR.
ROBERT L. FUJII
BY Bosworth, Sessions
Henstrom & Cain
ATTORNEYS

INVENTOR.
ROBERT L. FUJII

LIQUID COOLING ARRANGEMENT FOR DYNAMOELECTRIC MACHINE

BACKGROUND OF THE INVENTION

In aircraft and in other applications where weight is a penalty, dynamoelectric machines having high ratios of output per unit of weight are highly desirable. Various factors contribute to the achievement of this objective, including improvements in materials and higher operating speeds. Another route to increased weight reduction and better reliability is through improved cooling of the electrical windings. Improved cooling permits a reduction in both copper and supporting structure weight by permitting the use of increased current densities while maintaining winding temperatures within accepted thermal limits.

Known methods of cooling dynamoelectric machines include air cooling. Such machines have relatively open construction and provide efficient cooling to the extent permitted by the specific heat value of air because the cooling medium or air is in intimate contact with the heat-producing windings and core sections.

Oil is preferred to air as a cooling medium because it has a higher specific heat value. In conventional oil-cooled machines, however, it has generally been accepted as desirable to contain the cooling oil within closed ducts or passages routed in close proximity to the heat-producing parts of the machine. The success of such cooling arrangements depends upon short thermal paths and the reduction of high thermal gradients between the hot windings and the cooling oil. It also usually requires sometimes troublesome rubbing seals. Unfortunately, the steps often necessary to accomplish this successfully tend to increase the weight of the machine, and reduce reliability.

Recently, direct oil cooling schemes combining the direct contact approach of air cooling with the high specific heat value of oil as a cooling medium have been employed. Basically, these schemes have involved simply jetting cooling oil from a hollow rotor shaft, for example, into the interior of the machine. By the use of deflectors or merely by suitable location of the jets, the flow of coolant oil is attempted to be directed at the hot windings and end turns of the shaft-mounted rotating element. The stationary windings and structure rely upon coolant being thrown onto them by centrifugal force. Direct oil cooling by jet tends to permit increases in the allowable current density over air-cooled and sealed oil cooling systems. The method suffers from an inability to intimately contact all the normally exposed surface areas of the hot windings and core structures. Also, deleterious erosion of the insulation on the exposed windings often results from the impingement of the oil jet on the windings and from centrifugal impingement of oil flung from the rotating parts. Finally, quantities of unatomized liquid oil resulting in jet cooling systems and, particularly, the liquid oil invariably present in the airgap between the stationary and rotating elements produces windage and churning losses which tend to offset advantages obtained from the heat transfer characteristics of such jet cooling.

BRIEF SUMMARY OF THE INVENTION

This invention relates to an improved method and means for oil spray cooling dynamoelectric machines which achieves better cooling results than systems previously known and without their shortcomings and disadvantages. The advantageous results of this invention are achieved by spray coating the hot windings and supporting structures with a finely atomized oil spray to provide intimate contact with the cooling medium. The cooling oil is atomized under hydrostatic pressure through hydraulic atomizing nozzles which project the finely divided particles of oil at low velocities. The low velocity of the oil impinging directly on the insulated windings minimizes, if not eliminates, insulation erosion. The windage of the oil-misted air produced in the machine is so little as to be comparable in its deleterious effect to air windage.

Separate spray nozzles are provided for the stationary and for the rotating windings to be cooled and means are provided for isolating each of the relatively moving windings and supporting structures from the spray intended for the other. At the same time, steps are taken to prevent liquid oil coolant that coats the stationary and rotating elements from flowing into the airgap.

The stationary windings are protected against direct impingement of liquid oil flung centrifugally from the rotating elements. The oil coating deposited by the spray on the stationary windings is collected and pooled in direct heat-conducting relationship with the windings and, particularly, areas of the windings that might not otherwise be reached with the atomized spray.

Finally, the introduction of oil directly into the machine and onto the windings permits the elimination of troublesome contact seals. For example, oil is conducted from the supply passages in the stationary machine housing to the center of the hollow shaft through a concentric transfer tube having only a contactless journal bearing with the shaft and a self-aligning, nonrotating, no-slip O-ring seal with the housing. The journal bearing leaks a predetermined amount of oil which may be employed advantageously to lubricate a bearing of the machine and/or cool auxiliary winding structures located nearby.

DESCRIPTION OF A PREFERRED EMBODIMENT

The preferred embodiment described below is a high-speed, brushless AC generator housed in a casing adapted to interface with the casing of a drive mechanism to form what is known as an integrated drive generator. Typically, the drive mechanism is a device which turns the generator at a constant speed, even when the drive mechanism itself is driven by a variable speed power source. The invention is not limited to the particular dynamoelectric machine described here nor to dynamoelectric machines integrally combined with drive units. The invention comprehends, in its broadest aspect, all rotating dynamoelectric machines having heat-producing electrical windings and including machines housed in their own complete cases. In some of its more restricted aspects, it is especially applicable to brushless dynamoelectric machines; i.e., machines having rectifier assemblies interconnecting rotating exciter output windings and rotating main field windings and all mounted on the rotor for rotation therewith.

Figure 2:
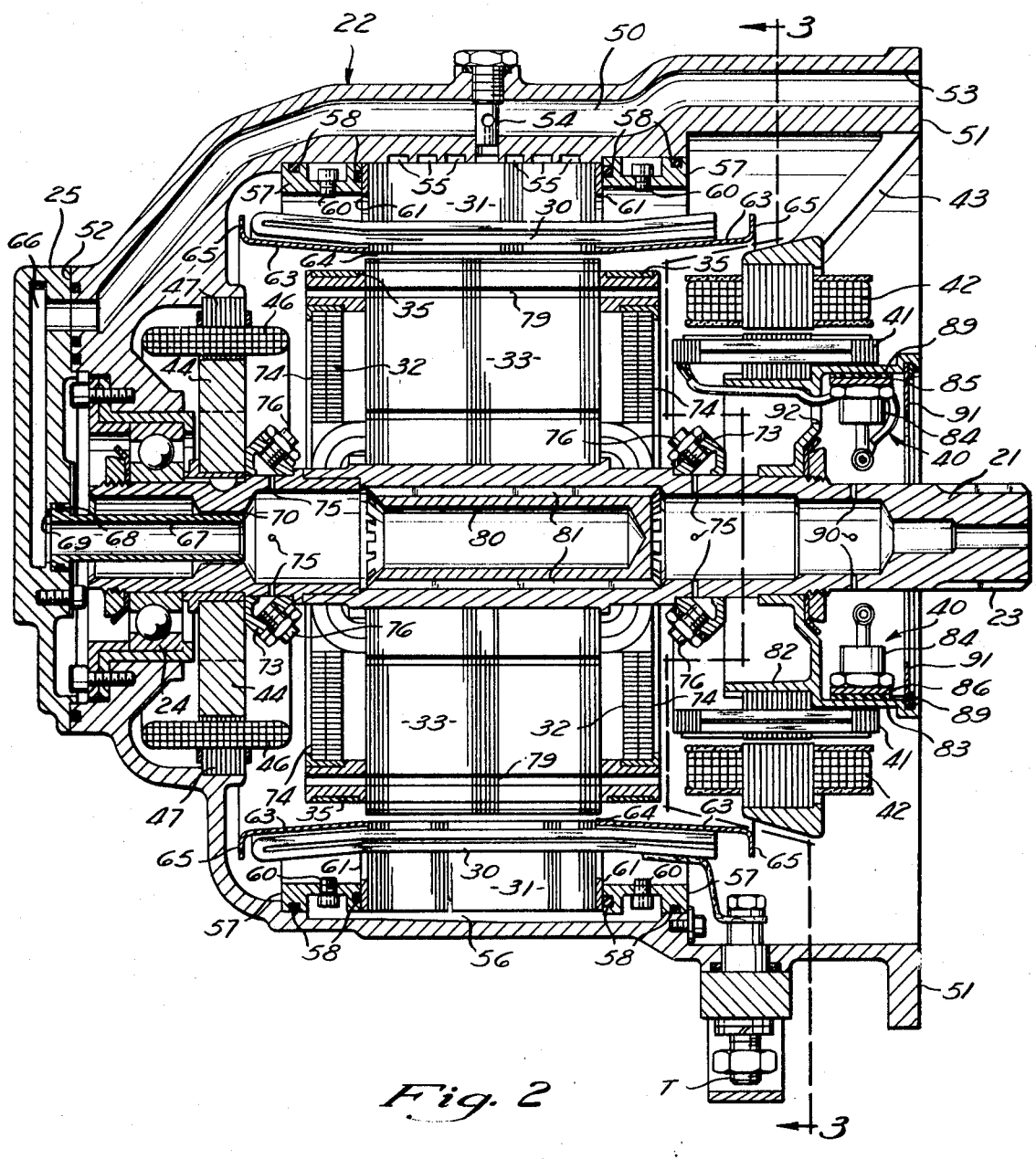
FIG. 2 is a side elevation view sectioned axially through the machine of FIG. 1 as indicated by the line 2—2.

As shown in FIG. 2, the generator comprises three alternators mounted on a common shaft 21 and all fitted and supported within a common casing indicated generally at 22. It will be observed that one end of casing 22 is open for attachment to a drive mechanism (not shown) to form an integrated drive machine.

Shaft 21 is splined at its drive end 23 for driving connection with and support by the shaft of the driving mechanism. The antidrive end of shaft 21 is supported for rotation by a bearing 24 removably mounted by suitable means through an opening in the antidrive end of casing 22. This opening is closed by an end cap 25 whose further functions will be described below.

The main alternator or output stage is located approximately in the middle of the machine as shown in FIG. 2 and is, of course, the largest of the three alternators. The main alternator has an output winding 30 located in the stator and wound upon the usual laminated annular core structure 31. Output winding 30, in this embodiment, delivers a three-phase output to the main terminals of the machine T.

Figure 3:
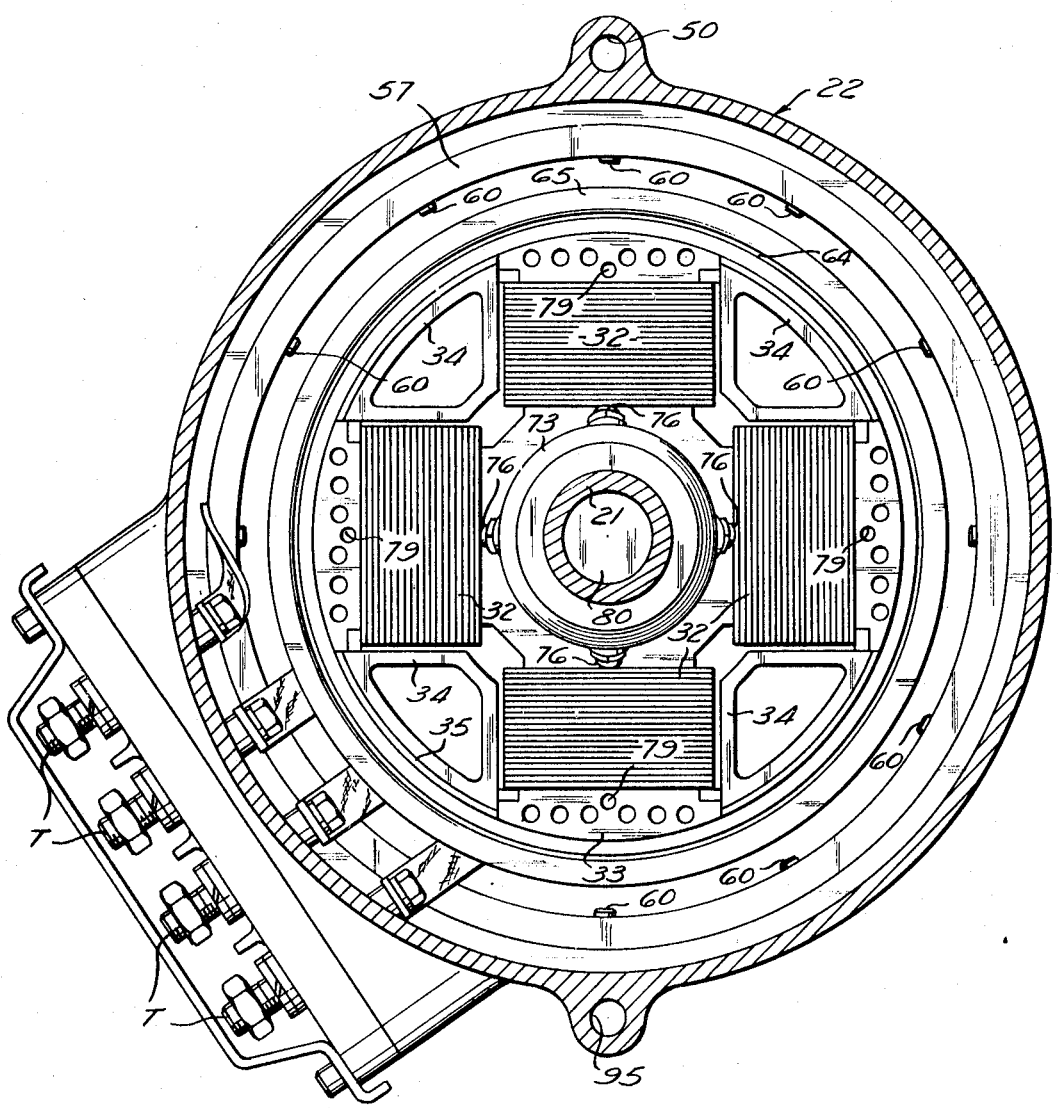
FIG. 3 is a transverse sectional view through the machine of FIGS. 1 and 2 taken as indicated by the line 3—3 in FIG. 2.

The rotor mounted on shaft 21 comprises a four-pole field winding 32 supported on a conventional laminated four-pole rotor form 33. Windings are preferably formed of edge-wound rectangular wire as indicated in FIG. 2. As seen in FIG. 3, coil side braces 34 seal the span between poles. The end turns of the field windings on each pole of the rotor are supported by annular support rings 35.

The main alternator field winding is excited by direct current supplied from a rotating rectifier assembly indicated generally at 40 (FIG. 2). The rectifier assembly 40 rectifies the alternating current output of the rotating output winding 41 of the main exciter mounted on shaft 21 between drive end 23 and the main alternator. The stationary field 42 of the main exciter is of conventional salient pole construction supported from casing 22 by a number of radial struts 43.

Field excitation for the main exciter is provided by a small pilot exciter machine located near the antidrive end of shaft 21 and comprising a permanent magnet rotor 44 and stationary output winding 46 supported in stator structure 47.

The rotating field and stationary output windings of the main alternator produce the greatest amount of heat and it is these windings or their counterparts in other dynamoelectric machines which require the greatest amount of coolant.

Figure 1:
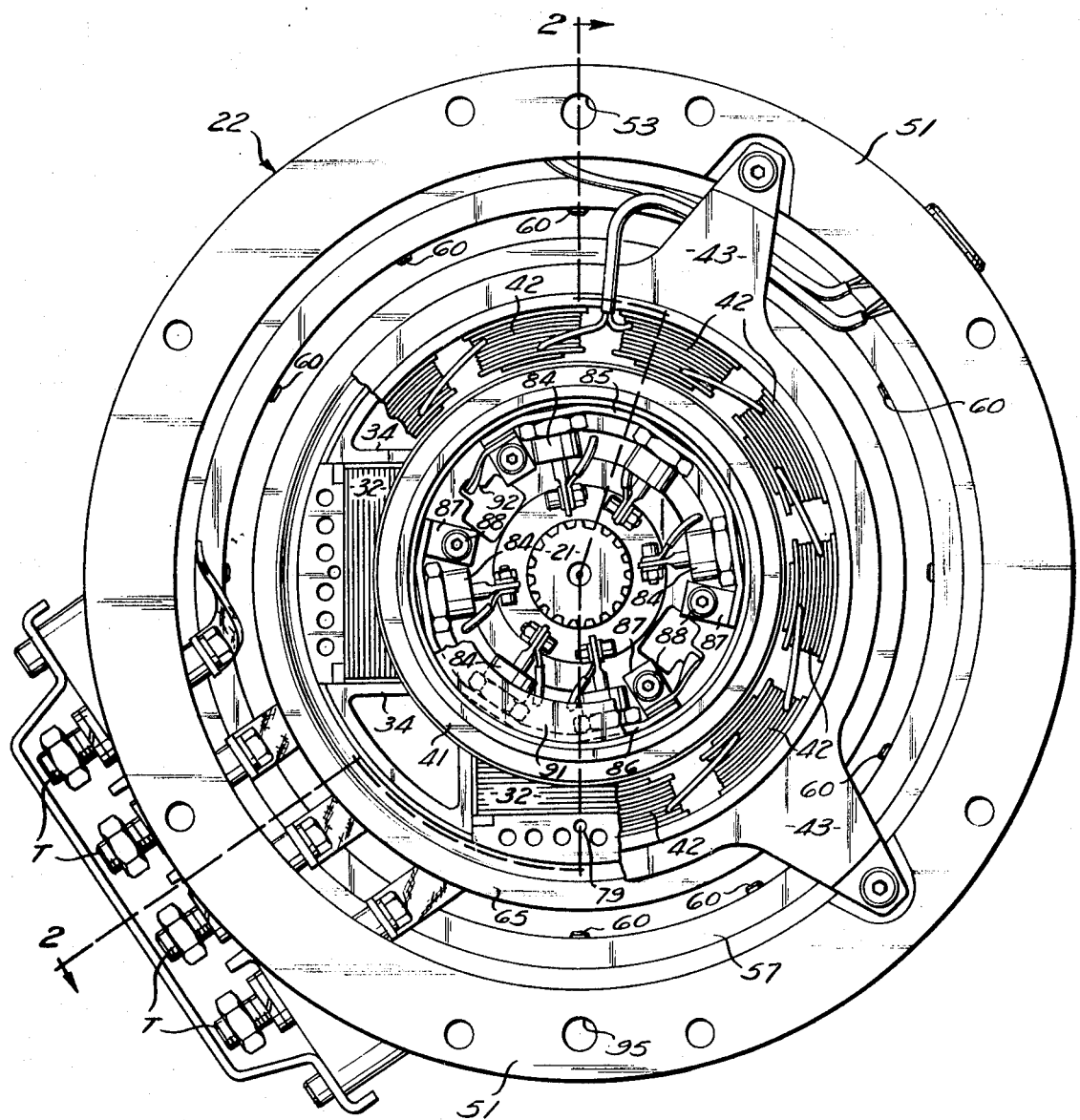
FIG. 1 is an end elevation view of an AC generator embodying this invention.

Liquid coolant, such as a high-temperature oil compatible with the insulation materials employed in building the machine and its windings, is supplied under pressure from the drive unit with which the generator shown mates. In individual machines, the oil can be supplied from any suitable source. A supply passage 50 is provided in housing 22 and extends generally axially from the face of housing mounting flange 51 to the interface 52 of the housing and end cap 25. The supply passage opening 53 in mounting flange 51 is shown in FIG. 1. In the machine shown, cooling oil is supplied at a pressure of 270 p.s.i. and at a flow rate of 7.5 g.p.m. Supply passage 50 is tapped in the region of the main alternator stator by a restrictor nozzle 54 which reduces the supply pressure to approximately 100 p.s.i. and delivers a metered coolant flow to a plurality of annular conduction cooling passages 55, machined in casing 22, and surrounding the back iron of the main alternator stator 31. By suitable baffling, the inlet flow through restrictor nozzle 54 is divided so that one-half flows one way around the stator and the other half flows the other way. After wiping the outer diameter of the stator, the flow unites at an axially extending groove 56 for supplying annular distributing manifolds or spray rings 57 located on opposite sides of the main alternator stator.

As shown in FIG. 2, spray rings 57 consist of annular members having channels closed by the interior surface of casing 22. O-ring seals 58 prevent the escape of the oil coolant. Atomizing spray nozzles 60 are mounted at circumferentially spaced intervals in spray rings 57 and are directed radially inwardly toward the backs or radially outer surfaces of the end turns of the main stator windings extending axially from each annular end face 61 of the stator structure. As illustrated in FIGS. 1 and 2, 24 atomizing spray nozzles 60 spray directly against the stator end turns.

Nozzles 60 are preferably hollow cone spray nozzles of conventional design for finely atomizing the coolant oil supplied to them under hydrostatic pressure. The hydraulic atomization accomplished by these nozzles produces a finely divided mist and projects it at low velocities. The result is a generally uniform and overall flowing coating of liquid oil coolant on all surfaces including the end turns that are exposed to the nozzle spray. Despite the close proximity of the nozzles to the end turns, no deleterious erosion of the end turn insulation is experienced because of the low velocity and the fineness of the atomized particles of coolant.

The radially inner surfaces of the stator winding end turns are shielded and supported by generally cylindrical shields 63 having a tight fit against the stator iron adjacent the main airgap 64 and extending axially out to and slightly beyond the end of the stator end turns where they terminate in a radially outwardly turned flange 65. The stator shields 63 collect and pool the flowing coolant that runs off the end turns, further directing the flow of cooling oil over the end turns and to the drain area in the lower part of the machine. The stator shields guide the flow of oil over the end turns, causing it to wipe areas not exposed to the spray and, thus, eliminate potential hot spots. Further, the stator shields tend to prevent the flow of any oil supplied by the nozzles of the stator spray rings from flowing into the main airgap 64. Finally, stator spray shields protect the stator end turns from centrifugal impingement of oil introduced into the machine radially inwardly of them and also protect the insulated parts radially inwardly of the stator from direct impingement of the stator spray.

The oil not bled off main supply passage 50 at stator restrictor nozzle 54 continues on and down the castin channel in end cap 25. A channel 66 in the end cap extends radially to the center of the machine and axially opposite the end of shaft 21. A transfer tube 67 sealed by an O-ring 68 through a central port 69 in the face of end cap 25 extends into hollow shaft 21 where it has a controlled leakage noncontact journal seal 70. The O-ring joint in the end cap allows the transfer tube to be self-aligning. Preferably, the clearance between the shaft and the transfer tube is controlled to permit approximately 0.05 g.p.m. of coolant oil to escape and to cool and lubricate bearing 24. The oil that passes through bearing 24 is pumped out by permanent magnet rotor 44 of the pilot exciter and splash cools its associated stator 47 and windings 46.

The bulk of the coolant oil introduced into the machine enters the hollow rotor shaft 21 through transfer tube 67. Rotating distributing manifolds or rotating spray rings 73 are mounted on shaft 21 adjacent to and associated with the opposite annular end faces 74 of the rotor structure. Rotor spray rings 73 provide an annular passage surrounding the hollow shaft 21 which is supplied with oil through restrictor orifices 75 in the wall of the shaft. These orifices meter the flow and reduce the coolant pressure to approximately 100 p.s.i. In each rotating spray ring 73 are mounted four spray nozzles 76 directed at the four poles of the rotor. Nozzles 76 are preferably full cone nozzles. Spray nozzles 76 which provide the cooling spray to the rotating field windings 32 have no relative movement with respect to the windings since they are mounted on and rotate with the same shaft. The rotor spray nozzles are preferably aimed slightly below or radially inside the rotor windings angled with respect to the axis of the shaft in the direction of rotation to compensate for centrifugal and circumferential drag forces imposed on the atomized spray during high-speed rotation of the rotor. The outer surfaces of the rotor end turns 32 are cooled by the direct impingement of the coolant spray from nozzles 76. The inner surfaces of end turns 32 are cooled by a centrifugal flow of oil over them. It should be noted that the edge-wound rectangular wire end turns in section as shown in FIG. 2 comprise a wall of copper axially spaced from the laminated pole core structure 33. The radially outer end of the wall supported by the annular supporting rings 35 and the radially inner end is spaced from the rotor shaft, permitting oil from rotor spray nozzles 76 to be directed into the spaces behind the rotor winding end turns. After cooling the outer surface of the rotor end turns, the flowing coating of oil is centrifuged onto stator shields 63 which guide it to the antidrive drain area in the lower part of the machine. The cooling surface flow on the inner side of the rotor winding end turns leaves the rotor at the urging of centrifugal force through rotor oil relief holes 79. Between the drive end and the antidrive end rotor spray rings, the hollow shaft is preferably provided with an aluminum insert 80 having axial conduction cooling passages 81 machined in its outer surface for channeling the flow of oil coolant against the inside wall of the rotor shaft. The rotor conduction passages are designed for laminar flow and are shaped for optimum transfer of heat from the rotor iron.

Rotor spray nozzles 76, like stator spray nozzles 60, finely atomize the cooling oil sprayed to them under hydrostatic pressure and project it at low velocity for uniform, overall deposition on the exposed surfaces of the rotor winding end turns. The fine atomization achieved by the nozzles and the low velocity at which the atomized coolant is projected minimizes any deleterious erosion of the insulation by the spray.

The main exciter rotor is provided with a support 82 having an annular axially extending flange 83. Mounted within the flange, as shown in FIG. 1, are six rectifiers 84 circumferentially spaced and arranged generally in a plane normal to their axis of rotation. The anode and cathode of each rectifier 84 is radially aligned with respect to the rotation axis. One set of three adjacent rectifiers 84 is mounted on a common conducting and cooling strip 85 and the other set of three adjacent rectifiers 84 is mounted on another electrically isolated cooling and conducting strip 86. Heat sink conducting strips 85 and 86 are mounted on exciter rotor support 82 by means of tabs 87 and screws 88. Strips 89 of insulating material electrically insulate the heat sinks from rotor support 82.

Hollow shaft 21 is provided with two orifices 90 through the shaft wall and which permit approximately 0.5 g.p.m. of the remaining coolant flow through the shaft to bathe and cool the rectifiers. The oil metered through these orifices is collected in an annular channel having a radially inwardly facing open side and formed by rotor support 82 and its flange 83 and an annular reservoir dam 91. Thus, the rotating rectifiers 84 and their heat sinks 85 and 86 stand in reservoir oil held in place with the annular channel by centrifugal force. The oil from the reservoir overflows through openings 92 in support 82 and tends to cool the main exciter rotor by wiping the inner diameter of the exciter rotor support 82 and the antidrive end turn of the exciter rotor windings 41.

The remainder of the coolant flow is transferred to the hollow shaft of the drive machine.

The oil which collects in the lower side at the antidrive end of the generator is scavenged by a drain pump in the drive mechanism through an oil drain port 95 in the antidrive end of the casing. The oil which collects at the drive end of the generator housing is scavenged by another drain pump in the drive mechanism through a similar port. The careful attention to scavenging of the oil introduced through this method of spray oil cooling tends to eliminate any deleterious churning losses that would offset the advantages otherwise afforded by the method.

Each of the various cooling oil deposition and coating means may be employed without all of the others as shown in the preferred embodiment herein. In a machine without a rotating rectifier assembly, for example, the centrifugal reservoir can be eliminated. The heavy cooling loads such as those consisting of the main field and output windings are most effectively handled by flowing coatings of coolant continuously and generally uniformly deposited on as many of their surfaces as possible from atomizing nozzles providing a finely divided spray of coolant. On the other hand, the centrifugal reservoir mode of direct coolant application to the structures to be cooled is effective in the case of the rotating rectifier assembly. Both the atomized spray technique and the reservoir provide a flowing coating of coolant over and directly on the structures and/or windings to be cooled. This invention comprehends applying a flowing coating of coolant to rotating or stationary rectifiers by means of an atomized coolant spray as well as to electrical windings and core structures by submerging them in a reservoir provided with coolant flow through it.

Various other modifications and adaptations of the method and means described above and comprehended by this invention will readily occur to those skilled in the art to which this invention pertains and may be made without departing from the spirit and scope of the invention.

I claim:

1. In a dynamoelectric machine having a housing, cylindrical stator with annular end faces and including a core structure supporting heat-producing electrical windings having end turns adjacent the annular end faces, and a rotor with annular end faces and mounted on a shaft for rotation within said stator and including a core structure supporting heat-producing electrical windings having end turns adjacent the annular end faces, the improved means for removing heat from said windings and core structures during operation of the machine comprising a circular array of atomizing devices supported adjacent to and associated in fixed relationship with each annular end face of said stator structure, said atomizing devices being adapted to atomize liquid supplied to them under hydrostatic pressure and to project the atomized particles in a diverging spray pattern and in a direction generally radially inwardly of the machine and at the end turns of said stator windings, a plurality of atomizing devices supported on the shaft of the machine adjacent to each annular end face of and for rotation with said rotor structure, said atomizing devices being adapted to atomize liquid supplied to them under hydrostatic pressure and to project the atomized particles in a diverging spray pattern and in a direction generally toward the annular end faces of said rotor and the end turns of said rotor windings, means for supplying liquid coolant to said atomizing devices under hydrostatic pressure, whereby atomized liquid coolant is continuously deposited on the electrical windings end turns providing a flowing coating of coolant over and off of them to pick up and carry away heat from them.

2. The improved means of claim 1 in which said means for supplying liquid coolant under hydrostatic pressure to said atomizing devices directed at the stator comprises a supply passage in the housing extending to both stator end faces and connected to a source of liquid coolant under hydrostatic pressure, a circular distribution manifold mounted adjacent each annular end face of said stator for supporting said atomizing devices associated with the stator annular end faces and supplying liquid coolant thereto, said manifolds each having an internal passage in communication with the housing supply passage and the atomizing devices mounted on the manifolds.

3. The improved means of claim 1 in which said means for supplying liquid coolant under hydrostatic pressure to said atomizing devices directed at the rotor comprises a supply passage extending axially through the shaft of the machine connected to a source of liquid coolant under hydrostatic pressure and a distribution manifold mounted on and encircling the shaft adjacent each annular end face of said rotor for supporting said atomizing devices and supplying liquid coolant thereto, said manifolds each having an internal passage in communication with the supply passage internal to the shaft and with the atomizing devices on the manifolds.

4. The improved means of claim 1 in which said means for supplying liquid coolant under hydrostatic pressure to said atomizing devices directed at the stator and rotor windings comprises a first supply passage in the housing extending to both stator end faces and to the center of one end of the machine, and distribution passages in communication with said housing supply passage and the atomizing devices directed at the stator, a second supply passage extending axially through the shaft of the machine, distribution passages in communication with said shaft supply passage and the atomizing devices supported on the shaft and directed at the rotor windings, and conduit means for connecting said housing and shaft supply passages to provide a continuous coolant supply path through the machine.

5. The improved means of claim 4 in which said conduit means connecting said housing and shaft supply passages comprises a transfer tube extending axially from and concentric with said shaft supply passage and beyond the end of said shaft into sealed connection with said housing supply passage, said tube having a journal seal with said shaft to permit relative rotation of said shaft with respect to said tube while conducting coolant, said journal seal having a predetermined clearance to provide a coolant-distributing passage.

6. The apparatus of claim 1 in which said atomizing devices mounted on said shaft for rotation with the rotor are directed radially below and circumferentially in the direction of rotation of the rotor with respect to the central portion of the structure and windings they are intended to spray.

7. The apparatus of claim 1 in which the stator winding has end turns extending axially of the machine beyond and away from each annular end face and said atomizing devices associated with the stator are directed at the radially outer surfaces of the winding end turns for direct impingement thereon of the atomized spray of said atomizing devices, and together with substantially cylindrical coolant spray shields extending axially of the machine from each stator end face radially inside the adjacent end turns and terminating in an outwardly turned radial flange beyond the axial extent of the adjacent end turns for shielding the stator including its windings from direct impingement thereon of atomized spray from the rotor atomizing device and the rotor including its windings from direct impingement thereon of atomized spray from the stator atomizing devices and for collecting and pooling the coolant sprayed at the stator end turns about them.

8. In a dynamoelectric machine having a housing, a rotor with annular end faces and mounted on a shaft for rotation within said stator and including a core structure supporting heat-producing electrical windings having end turns adjacent the annular end faces, the improved means for removing heat from said windings and core structures during operation of the machine comprising a plurality of atomizing devices supported on the shaft of the machine adjacent to each annular end face of and for rotation with said rotor structure, said atomizing devices being adapted to atomize liquid supplied to them under hydrostatic pressure and to project the atomized particles in a diverging spray pattern and in a direction generally toward the annular end faces of said rotor and the end turns of said rotor windings, and particularly radially below and circumferentially in the direction of rotation of the rotor with respect to the central portion of the structure and windings they are intended to spray, means for supplying liquid coolant to said atomizing devices under hydrostatic pressure, whereby atomized liquid coolant is continuously deposited on the electrical windings end turns providing a flowing coating of coolant over and off of them to pick up and carry away heat from them.

9. In a dynamoelectric machine having a housing, cylindrical stator with annular end faces and including a core structure supporting heat-producing electrical windings having end turns adjacent the annular end faces, the improved means for removing heat from said windings and core structures during operation of the machine comprising a circular array of atomizing devices supported adjacent to and associated in fixed relationship with each annular end face of said stator structure, said atomizing devices being adapted to atomize liquid supplied to them under hydrostatic pressure and to project the atomized particles in a diverging spray pattern and in a direction generally radially inwardly of the machine and at the end turns of said stator windings, a supply passage in the housing extending to both stator end faces, a circular distribution manifold mounted adjacent each annular end face of said stator for supporting said atomizing devices associated with the stator annular end faces and supplying liquid coolant thereto, said manifolds each having an internal passage in communication with the housing supply passage and the atomizing devices mounted on the manifolds, means for supplying liquid coolant under hydrostatic pressure to said housing supply passage, whereby atomized liquid coolant is continuously deposited on the electrical windings end turns providing a flowing coating of coolant over and off of them to pick up and carry away heat from them.

10. In a dynamoelectric machine having a housing, a shaft mounted for rotation therein and a rotating assembly of electrical conducting elements mounted on the shaft for rotation therewith, the improved means for removing heat from the electrical elements of the assembly during operation of the machine comprising an annular channel having a radially inwardly facing open side mounted on said shaft for rotation with it and in which said electrical elements are circumferentially arranged and mounted, a coolant passage in said shaft having orifices for metering a flow of coolant under hydrostatic pressure from the shaft into said annular channel during rotation of the shaft and channel, and overflow openings in said channel to meter a flow of coolant out of said channel whereby said electrical elements are cooled in a centrifugally maintained reservoir of coolant having a flow of coolant therethrough.

11. The improved means of claim 10 in which said electrical conducting elements are rectifiers.

12. The improved means of claim 10 together with other electrical conducting elements and their supporting structures mounted for rotation with said annular channel and radially outwardly of the overflow openings in the channel whereby the overflow of the coolant from the channel provides a flowing coating of coolant directly of said other electrical conducting elements and their supporting structures.

* * * * *